(12) United States Patent
Zhao et al.

(10) Patent No.: US 11,874,176 B2
(45) Date of Patent: Jan. 16, 2024

(54) SYSTEMS AND METHODS OF ADAPTIVE TWO-WAVELENGTH SINGLE-CAMERA IMAGING THERMOGRAPHY (ATSIT) FOR ACCURATE AND SMART IN-SITU PROCESS TEMPERATURE MEASUREMENT DURING METAL ADDITIVE MANUFACTURING

(71) Applicant: UNIVERSITY OF PITTSBURGH—OF THE COMMONWEALTH SYSTEM OF HIGHER EDUCATION, Pittsburgh, PA (US)

(72) Inventors: Xiayun Zhao, Pittsburgh, PA (US); Chaitanya Krishna Prasad Vallabh, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 800 days.

(21) Appl. No.: 17/015,062

(22) Filed: Sep. 8, 2020

(65) Prior Publication Data

US 2021/0140830 A1    May 13, 2021

Related U.S. Application Data

(60) Provisional application No. 62/932,962, filed on Nov. 8, 2019.

(51) Int. Cl.
*G01J 5/08*     (2022.01)
*G01J 5/59*     (2022.01)
(Continued)

(52) U.S. Cl.
CPC ............. *G01J 5/59* (2022.01); *G01J 5/0802* (2022.01); *G01J 5/0804* (2022.01);
(Continued)

(58) Field of Classification Search
None
See application file for complete search history.

(56) References Cited

U.S. PATENT DOCUMENTS

| 2016/0135891 | A1* | 5/2016 | Feldman | ................ A61B 18/20 606/3 |
| 2018/0049642 | A1* | 2/2018 | Mak | ......................... A61B 5/00 |
| 2022/0102934 | A1* | 3/2022 | Jeon | ...................... H01S 3/2207 |

* cited by examiner

*Primary Examiner* — Hoon K Song
(74) *Attorney, Agent, or Firm* — Paul D. Bangor, Jr., Esq.; Clark Hill PLC

(57) ABSTRACT

A two-wavelength, single-camera imaging thermography system for in-situ temperature measurement of a target, comprising: a target light path inlet conduit for receiving a target light beam reflected from the target; a beam splitter installed in a splitter housing at a distal end of the target light path conduit, wherein the beam splitter divides the target light beam into a first light beam and a second light beam; a first light path conduit emanating from the splitter housing comprising a first aperture iris installed within the first light path conduit for aligning the first light beam; a first band pass filter installed within the first light path conduit for regulating the first light beam to a first wavelength λ1 and an optional half waveplate installed within the first light path conduit to modulate a polarization ratio of the first light beam of λ1 wavelength; a second light path conduit emanating from the splitter housing comprising a second aperture iris installed within the second light path conduit for aligning the second light beam; a second band pass filter installed within the second light path conduit for regulating the second light beam to a second wavelength λ2; a junction housing, wherein distal ends of each of the first and second light path conduits are connected to the junction housing; a polarizing beam splitter installed in the junction housing, wherein the polarizing beam splitter reflects the first light beam of λ1 wavelength along the same path or a parallel (Continued)

path of the second light beam of λ2 wavelength that passes directly through the polarizing beam splitter unreflected to create a merged light beam comprising light of λ1 and λ2 wavelengths; and a light path outlet conduit connected to the junction for directing the merged beam to a high-speed camera for imaging.

20 Claims, 4 Drawing Sheets

(51) Int. Cl.
  *G02B 27/28*     (2006.01)
  *G01J 5/0802*    (2022.01)
  *G01J 5/0804*    (2022.01)
  *G01J 5/00*      (2022.01)
  *G01J 5/48*      (2022.01)
(52) U.S. Cl.
  CPC ......... *G02B 27/283* (2013.01); *G02B 27/286* (2013.01); *G01J 5/48* (2013.01); *G01J 2005/0077* (2013.01)

SYSTEMS AND METHODS OF ADAPTIVE TWO-WAVELENGTH SINGLE-CAMERA IMAGING THERMOGRAPHY (ATSIT) FOR ACCURATE AND SMART IN-SITU PROCESS TEMPERATURE MEASUREMENT DURING METAL ADDITIVE MANUFACTURING

CROSS REFERENCE TO RELATED APPLICATIONS

This application claims the benefit of the filing date of U.S. provisional patent application Ser. No. 62/932,962, filed on Nov. 8, 2019, the entirety of which is incorporated herein by reference for all purposes.

STATEMENT REGARDING FEDERALLY SPONSORED RESEARCH OR DEVELOPMENT

This invention was made with government support under U.S. Department of Energy, grant #DE-FE0031774. The government has certain rights in the invention.

BACKGROUND OF THE DISCLOSURE

Introduction

The major challenges in in-situ sensing and measurement for metal AM is the ultra-fast and complex process dynamics, which demand multiple sensors and high sampling frequencies for data acquisition and processing. Existing in-situ monitoring methods for metal AM processes typically adopt vision camera imaging methods to infer geometric flaws or other properties but has limited accuracy due to lacking information of underlying thermal physics, e.g., the in-process temperature profile and temperature history, which greatly account for the melt pool morphology and residual stress-induced geometric flaws observed by the in-situ camera [1-3].

Of utmost importance, in-situ temperature measurement is the key to achieve a comprehensive in-situ process monitoring for metal AM. However, currently, there are no mature technologies for monitoring and measuring the full-field temperature profile throughout the process at a sufficiently small time scale (order of μs) to capture the ultrafast melting and cooling process during laser metal AM process. Typically, a metal AM process involves melt pool, plasma, metal vapor, and spatter. Measuring the transient temperature of the melt pool is important for understanding the ultrafast process dynamics such as the keyholing mode which accounts for keyhole pores generation. Also, it can provide information on heating and cooling rates, which significantly affect the microstructure. However, the ultrafast laser melting and solidification process occurs on the order of hundreds of microseconds (e.g., 200-600 μs) [4], necessitating a high-speed measurement. Besides, plasma, which is generated by laser irradiating the vaporization (caused due to the process), fluctuates with laser energy density and significantly affects the radiation by reflection or refraction [5]. This adds complexity to the temperature measurement.

Conventional methods such as photodiode, thermal couple, infrared camera and off-the-shelf pyrometers cannot measure absolute temperature globally, accurately or rapidly. For instance, the photodiode method can only provide single-point light emission signal which cannot be used to infer real temperature value or profile. Commercial IR thermography or pyrometers exhibit notable errors and uncertainties as the theoretical assumptions can be weakened in metal AM environment (e.g., spatter, vapor).

Emerging multi-wavelength imaging pyrometry has been developed to measure temperature in other ultrafast processes such as combustion [6] and fire flames [7]. For metal AM processes, recently, a two-color high-speed (100,000 fps) [8] and a four-color slow (60 fps) [9] imaging pyrometry have been respectively reported to measure melt pool temperature to certain extent with notable limitations in measurement accuracy and speed. This present disclosure aims to address the limitations reported in these works and also realizes a desired accurate, fast and robust full-field temperature measurement system and method to provide valuable insights on metal AM process dynamics.

Principles: Basic Theory

The spectral radiance ($L_B$) of a blackbody (emissivity, $\varepsilon=1$) is given by Planck's law:

$$L_B(\lambda, T) = \frac{2hc^2}{\lambda^5(\exp(hc/k_B\lambda T) - 1)} \quad (1)$$

where h is the Planck's constant, c is the speed of light, $\lambda$ is the wavelength, T is the absolute temperature of the body and $k_B$ is Boltzmann's constant. The above expression can be reduced using Wien's approximation as follows:

$$L_B(\lambda, T) = \frac{2hc^2}{\lambda^5(\exp(hc/k_B\lambda T))} \quad (2)$$

This approximation contributes to an error of less than 1% under the assumption $hc/\lambda \gg k_B T$. In the proposed application the objects of interests are not perfect blackbodies and therefore the above equations have to be modified accordingly for calculating the temperature of the melt pool for a certain AM material. For a material with $\varepsilon \neq 1$ Eq. 2 can be written as:

$$L(\lambda, T) = \frac{(2hc^2)\varepsilon A}{\lambda^5(\exp(hc/k_B\lambda T))} \quad (3)$$

where A is the transmission efficiency of the optical path. In the above equation the spectral radiance can be identified as the measurement of intensity I ($\lambda$, T). The emissivity is dependent on the material and can vary with parameters such as temperature, wavelength and surface finish of an object. Therefore, the exact emissivity value is often hard to estimate even with proper calibration methods [10]. To overcome the issues with emissivity measurements, the intensity measurements are often acquired at two different wavelengths. The measurement wavelengths ($\lambda_1$ and $\lambda_2$) are chosen to be close to each other, which leads to the assumptions of emissivities ($\varepsilon_1$ and $\varepsilon_2$) being almost equal. The expression for calculating the temperature at the two measured intensities $I_1$ and $I_2$ with the employed two-wavelength technique is given by:

$$T = \frac{hc/k_B \left(\frac{1}{\lambda_2} - \frac{1}{\lambda_1}\right)}{\ln\left(\frac{I_1}{I_2}\right) - \ln\left(\frac{\varepsilon_1}{\varepsilon_2}\right) - \ln\left(\frac{A_1}{A_2}\right) - 5\ln\left(\frac{\lambda_2}{\lambda_1}\right)} \quad (4)$$

It is worth noting that Equation (4) can be used to derive the temperature given the exact values of wavelengths, emissivities, and intensities. However, emissivity values ($\varepsilon_1$ and $\varepsilon_2$) cannot be accurately measured and usually vary with complicated factors (materials, surfaces, etc.), inducing significant errors in the temperature measured by Equation (4). To improve the temperature measurement accuracy by eliminating the use of inaccurate or unreliable priori knowledge of the emissivities, one common practice is to take the advantage of a material's known-to-be relatively wavelength-independent emissivity segment, referred to as "flat emissivity" region in a material's emissivity-wavelength curve, where one can assume that $\varepsilon_1 \approx \varepsilon_2$ and thus the term $\ln\left(\frac{\varepsilon_1}{\varepsilon_2}\right)$ is negligible can be calculated with better accuracy using only the ratio of emission intensity values $I_1$ and $I_2$. The accuracy of this method heavily depends on the appropriate choice for the measurement wavelengths ($\lambda_1$ and $\lambda_2$). Existing methods unanimously use a setting with fixed wavelengths corresponding to certain "flat emissivity" region of some material and are limited to being able to measure temperatures in situ exclusively for AM of that material only. This present disclosure is directed to a dynamic adaptive temperature measurement system to tackle that shortcoming.

SUMMARY

In a preferred aspect, the present disclosure comprises a two-wavelength, single-camera imaging thermography system for in-situ temperature measurement of a target, comprising: a target light path inlet conduit for receiving a target light beam reflected from the target; an optional power attenuating neutral density filter installed within the light path inlet tube; an optional converging lens installed within the light path inlet tube for converging the target light beam and removing aberrations from the target light beam; a beam splitter installed in a splitter housing at a distal end of the target light path conduit, wherein the beam splitter divides the target light beam into a first light beam and a second light beam; a first light path conduit emanating from the splitter housing comprising a first aperture iris installed within the first light path conduit for aligning the first light beam; a first band pass filter installed within the first light path conduit for regulating the first light beam to a first wavelength λ1 and a half waveplate installed within the first light path conduit to modulate a polarization ratio of the first light beam of λ1 wavelength; a second light path conduit emanating from the splitter housing comprising a second aperture iris installed within the second light path conduit for aligning the second light beam; a second band pass filter installed within the second light path conduit for regulating the second light beam to a second wavelength λ2; a junction housing, wherein distal ends of each of the first and second light path conduits are connected to the junction housing; a polarizing beam splitter installed in the junction housing, wherein the polarizing beam splitter reflects the first light beam of λ1 wavelength along the same path or a parallel path of the second light beam of λ2 wavelength that passes directly through the polarizing beam splitter unreflected to create a merged light beam comprising light of λ1 and λ2 wavelengths; and a light path outlet conduit connected to the junction for directing the merged beam to a high-speed camera for imaging.

In another preferred aspect of the two-wavelength, single-camera imaging thermography system, the first light path conduit comprises a first plurality of mirrors for directing the first light beam through the first light path conduit and wherein the second light path conduit comprises a second plurality of mirrors for directing the second light beam through the second light path conduit.

In yet another preferred aspect of the two-wavelength, single-camera imaging thermography system, the first and second light path conduits are configured so that light travel time through the first light path conduit is equal to light travel time through the second light path conduit.

In another preferred aspect of the two-wavelength, single-camera imaging thermography system, the first plurality of mirrors is equal to or not equal to the second plurality of mirrors.

In a further preferred aspect of the two-wavelength, single-camera imaging thermography system, the converging lens is an infinite-corrected converging lens.

In another preferred aspect of the two-wavelength, single-camera imaging thermography system, the beam splitter divides the target light beam into the first light beam and the second light beam which are equal or unequal.

In yet another preferred aspect of the two-wavelength, single-camera imaging thermography system, none of the first and second light path conduits define only a single straight line from the splitter housing to the junction housing.

In another preferred aspect, the two-wavelength, single-camera imaging thermography system further comprises a computer controller which may or may not use machine learning or artificial intelligence.

In yet another preferred aspect, the two-wavelength, single-camera imaging thermography system further comprises a computer controllable digital shutter installed in each of the first and second light path conduits, wherein each of the computer controllable digital shutters is controlled by a DAQ system connected to a computer associated with the system.

In another preferred aspect of the two-wavelength, single-camera imaging thermography system, the sampling rates of the DAQ system are dependent on the monitored metal AM process dynamics. For instances, the sampling rate could be in the order of MHz ($10^6$ Hz) for laser based metal AM process or $10^4$ Hz for wire arc welding based AM processes.

In a further preferred aspect of the two-wavelength, single-camera imaging thermography system, the frequency and phase of the first and second light beams are set so that the DAQ system outputs modulation signals in partial duty cycle to each of the computer controllable digital shutters to allow each of the shutters to open and close repeatedly to dynamically modulate the first and second light beams, respectively, to form a temporal modulation profile, wherein the first and second light beams have been transformed from continuous beams to two pulsed beams after this dynamic modulation, with no time overlapping.

In another preferred aspect of the two-wavelength, single-camera imaging thermography system, each of the first and second band pass filters may or may not comprise a tunable band pass filter.

In another preferred aspect, the present disclosure comprises a method for two-wavelength, single-camera imaging thermography for in-situ temperature measurement of a target, comprising: receiving in a target light path inlet conduit a target light beam reflected from the target; attenuating the target light beam; converging the target light beam; removing aberrations from the target light beam; dividing the target light beam into a first light beam and a second light beam; directing the first light beam through a first aperture iris to align the first light beam; directing the first light beam through a first tunable or non-tunable band pass filter to regulate the first light beam to a first wavelength $\lambda_1$; directing the second light beam through a second aperture iris to align the second light beam; directing the second light beam through a second tunable or non-tunable band pass filter to regulate the second light beam to a first wavelength $\lambda_2$; merging the first light beam of $\lambda_1$ wavelength along the same path or a parallel path of the second light beam of $\lambda_2$ wavelength to create a merged light beam comprising light of $\lambda_1$ and $\lambda_2$ wavelengths; and directing the merged beam to a high-speed camera for imaging.

In yet another preferred aspect, the two-wavelength, single-camera imaging thermography method further comprises: directing the first light beam through a half waveplate to modulate a polarization ratio of the first light beam of $\lambda_1$ wavelength; reflecting the first light beam of A wavelength off of a polarizing beam splitter; and passing the second light beam of $\lambda_2$ wavelength directly through the polarizing beam splitter unreflected along the same path or a parallel path as the reflected first light beam of $\lambda_1$ wavelength to create the merged light beam comprising light of $\lambda_1$ and $\lambda_2$ wavelengths.

In another preferred aspect, the two-wavelength, single-camera imaging thermography method further comprises: directing each of the first and second light beams through a respective computer controllable digital shutter.

In yet another preferred aspect, the two-wavelength, single-camera imaging thermography method further comprises: setting the frequency and phase of the first and second light beams so that a DAQ system of a computer controlling each of the computer controllable digital shutters outputs modulation signals in partial duty cycle (typically 50%, but could be some other custom proportion value that will be incorporated in the calculation of two wavelength intensity ratio thermography) to each of the computer controllable digital shutters to allow each of the shutters to open and close repeatedly to dynamically modulate the first and second light beams, respectively, to form a temporal modulation profile, wherein the first and second light beams have been transformed from continuous beams to two pulsed beams after this dynamic modulation, with no time overlapping.

In another preferred aspect of the two-wavelength, single-camera imaging thermography system, each of the first and second light beam path may or may not comprise exactly the same optics components as shown in the Figures. Embodiment design of the optics can vary with the specific metal AM process or machine or material. For instances, in some embodiment design, one or some of the components (as shown in the Figures), e.g., NIR-ND neutral density filter, waveplate, and converging lens, may not be used or may be replaced by other types of optics components. In some embodiment design, achromatic doublets may be added to the system setup. In some embodiment designs, a beam expander, or some magnification optics (e.g., magnification objective lens) may be added to the system setup to enhance resolutions.

In a variation or modification of the disclosed two-wavelength, single-camera imaging thermography system, more than two wavelengths light beams could be derived in a similar setup, delivering multi-wavelength images onto a single camera sensor. This multi-wavelength single-camera imaging thermography system is an expected extension of the two-wavelength, single-camera imaging thermography system to expand temperature measurement range and or improve temperature measurement accuracy or for some other purposes such as estimating emissivities. The present disclosure is also directed to such an extension.

Additive manufacturing (AM) can flexibly and efficiently fabricate 3D parts with tailored properties for a myriad of applications. Metal AM has appealing values to bring in industrial and economical prosperities as it can facilitate the development of novel metallic materials (e.g., high-performance alloys), complex metallic structures and new metallic functionalities. In metal AM, the temperature fields of melting pool and interaction zone have critical impacts on phase transformation, microstructure formation, and mechanical properties. Researchers have developed various approaches to track real-time temperature during ultrahigh temperature in AM. Nevertheless, due to the limitations of the conventional infrared cameras and pyrometers, the large temperature gradient around the energy source demands a capable measurement system and method. This present disclosure is directed to a new in-situ process temperature measurement technology for metal AM, which can adaptively measure the full-field temperature profiles for melting pool and surrounding area in real time with material discretion, high speed, high resolution, high accuracy and high precision. Unlike existing two-camera two-wavelength imaging pyrometers, the present disclosure adopts only one camera to acquire two-wavelength intensities at one set, to (1) reduce the equipment cost by eliminating the need for two expensive high-speed cameras and (2) improve the measurement accuracy by avoiding the uncertainties caused by extra optics and camera sensors in traditional two-camera methods. Another unique feature of the present disclosure is the use of tunable filters to unprecedentedly enable dynamical configuration of the two measurement wavelengths to (1) adaptively measure the temperature profiles for diverse printing materials and (2) incorporate the emissivity variations into the measurement model to enhance the accuracy of temperature measurement. The technology of Adaptive Two-wavelength Single-camera Imaging Thermography (ATSIT) of the present disclosure consists of the following novel modular optical system with (a) spectral modulation, (b) temporal modulation, and (c) tunable filter modules for adaptively varying-wavelength measurements for metal AM that needs to process a range of materials either within a single multi-material printing job or across different printing jobs with different materials.

BRIEF DESCRIPTION OF THE DRAWINGS

The present disclosure is illustrated by way of example and not limitation in the figures of the accompanying drawings, in which.

DETAILED DESCRIPTION

It is to be understood that the descriptions of the present disclosure have been simplified to illustrate elements that are relevant for a clear understanding of the present disclosure, while eliminating, for purposes of clarity, other elements that may be well known. Those of ordinary skill in the art will recognize that other elements are desirable and/or required in order to implement the present disclosure. However, because such elements are well known in the art, and because they do not facilitate a better understanding of the present disclosure, a discussion of such elements is not provided herein. Additionally, it is to be understood that the present disclosure is not limited to the embodiments described herein but encompasses any and all embodiments within the scope of the description and the following claims.

Figure 1:
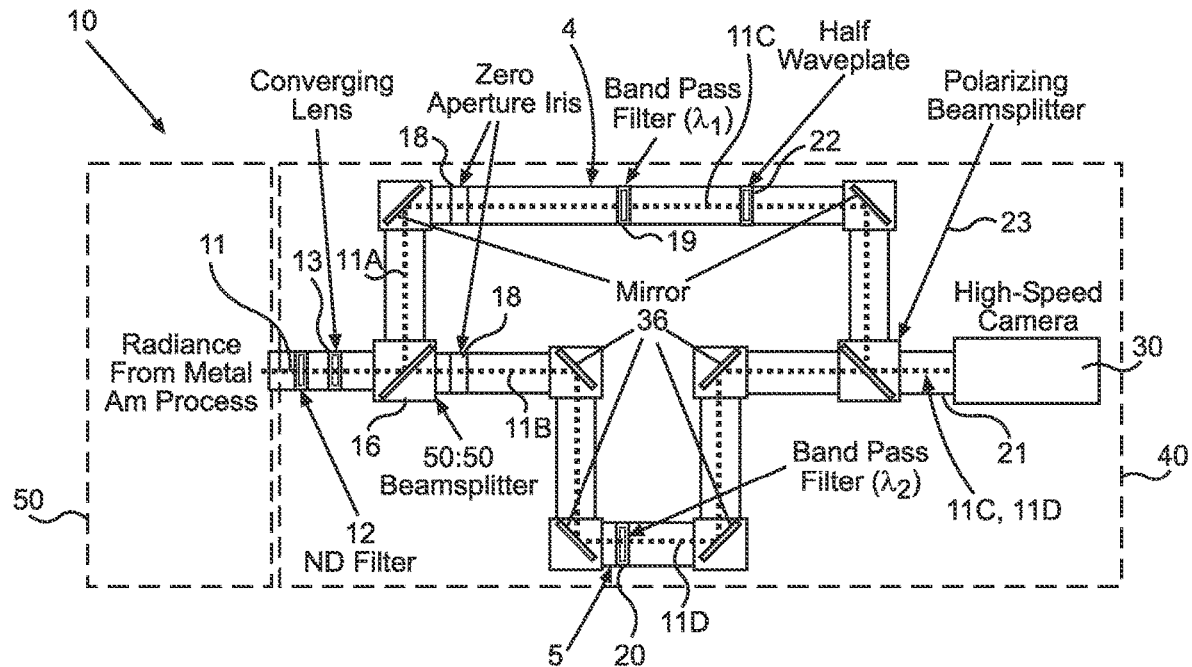
FIG. 1 shows a basic Layout of two-wavelength single-camera imaging thermography (TSIT) for in-situ temperature measurement system (within red dashed frame) of the present disclosure.

Adaptive Two-Wavelength Single-Camera Imaging Thermography (ATSIT): Systems and Methods Systems and Methods to Attain Pixel-Wise Two-Wavelength Intensities for General Temperature Measurement Based on the theory discussed herein, a preferred new temperature measurement system of the present disclosure comprises a two-wavelength single-camera imaging thermography (TSIT) 10 with the aim to produce spatial temperature distribution of a melt pool. The temperature measurement system 10 is based on two-wavelength technique using only one single camera as opposed to the conventional two-camera or two-color imaging pyrometry methods [6-8]. FIG. 1 shows the general in-situ temperature measurement system 10 for any type of metal AM process of the present disclosure. The measurement system is explained in detailed herein.

FIG. 1 shows a preferred basic layout of two-wavelength single-camera imaging thermography (TSIT) for in-situ temperature measurement system 10 of the present disclosure (within dashed frame 40) where the necessary optical components (described below) help split radiance from metal AM process 50 into two beams 11A and 11B, where two different wavelength selections ($\lambda_1$ and $\lambda_2$) are separately applied. Then the beams 11C and 11D in selected wavelengths are merged into a single light path 21, which reaches the high-speed camera 30 for imaging.

At the beginning of the light path, the reflected light 11 from the print bed of AM process 50 passes through a near-infrared neutral density (NIR ND) filter 12, which attenuates the power of the incoming laser beam 11 reflected from the target within AM process 50. The maximum attenuation occurs at the working wavelength (1064 nm) of the ND filter 12. This filter 12 is utilized to prevent the power of reflected laser beam 11 from damaging high-speed camera 30 and other optical components. An infinite-corrected lens 13 helps converge and pass the reflected light 11 without any aberrations. To divide the light 11 into two discrete beams 11A and 11B for tuning their wavelengths, a beam splitter 16 of 50:50 split ratio is employed. Beam splitter 16 transmits half of the incoming light 11B and reflects the other half 11A of the incoming light, orthogonal to each other, as shown in FIG. 1. Each light path 11A and 11B has a zero-aperture iris 18 to help align and also adding a functionality of testing each beam 11A and 11B independently. The wavelength regulation is fulfilled by two band-pass filters 19, 20 at different working wavelengths, namely, $\lambda_1$ and $\lambda_2$, respectively. These are the working wavelengths of the two-wavelength system (Eq. 4). To merge the wavelength adjusted beams 11C, 11D into the path 21 that reaches the camera 30, a combination of half waveplate 22 and a polarizing beam splitter 23 are utilized. The half waveplate 22 is being utilized to adjust polarization ratio of the beam 11C in $\lambda_1$ wavelength. After polarization modulation, the first beam 11C in FIG. 1 is 100% s-polarized and thus, based on the specifications of the polarizing beam splitter (PBS) 23, can be fully reflected. The second beam 11D directly passes through the PBS 23. The merged beams 11C and 11D of path 21, are parallel to each other, can be overlapped or stay close to each other with a small distance. Notably, the respective optical paths 4, 5 of the two beams from the ND filter 12 to the polarizing beam splitter 23 is strictly set to be the same using mirrors 36 as shown in the figures to avoid time lag in the beam travel.

A preferred design of the TSIT system 10 of the present disclosure adopts modularization to make it readily applicable to different measurement scenarios. To attain pixel-wise two-wavelength intensities for achieving the envisioned TSIT, two different measurement schemes are devised: a) spatial modulated imaging and b) temporal modulated imaging. These methods are detailed herein.

Spatially Modulated Imaging

Figure 2A:
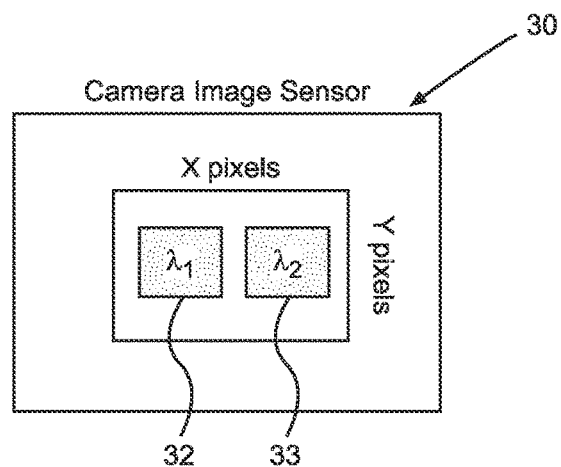
FIG. 2A is a schematic showing a preferred spatial modulation measurement scheme for a preferred TSIT front view of the image sensor showing the spatially separated images corresponding to the two measurement wavelengths ($\lambda_1$ and $\lambda_2$).

A preferred spatial modulation measurement scheme of the present disclosure is aimed to be achieved by precisely deflecting one of the incoming laser beams such that two images 32, 33 are projected on to the image sensor 30, schematically shown in FIG. 2A. This idea of spatially separating the beams is based on the principle of diffraction. Commercially available beam samplers and diffraction grating systems diffract the incoming beam into multiple projections (based on order of diffraction). According to the present disclosure the beam is not diffracted but, simply deflected to achieve the objective of imaging two laser beams of different intensities for measuring the temperature profile of the melt pool.

Figure 2B:
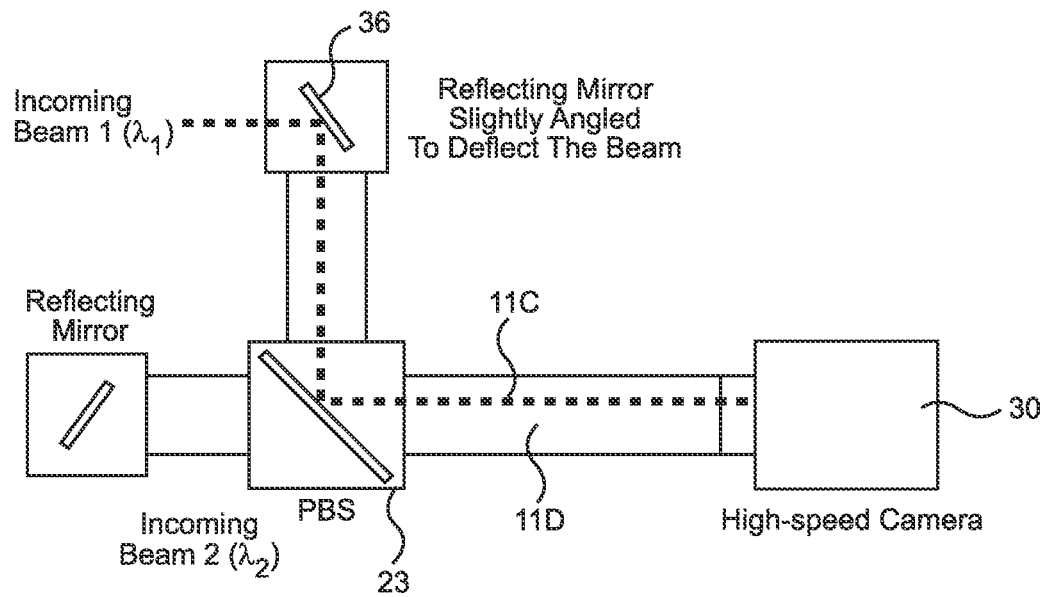
FIG. 2B is a schematic showing a preferred spatial modulation measurement scheme for preferred optical paths of the two beams and their corresponding images on the image sensor.

FIGS. 2A and 2B show a schematic of a preferred spatial modulation measurement scheme for TSIT of the present disclosure. FIG. 2A is a front view of the image sensor 30 showing the spatially separated images 32, 33 corresponding to the two measurement wavelengths ($\lambda_1$ and $\lambda_2$) of light beams 11C and 11D, respectively. FIG. 2B shows preferred optical paths of the two beams 11C and 11D and their corresponding images 32, 33 on the image sensor 30. This is achieved by precisely angling the reflecting mirror 36 for incoming beam 11C as shown. PBS in FIG. 2 refers to the polarizing beam splitter 23.

Temporally Modulated Imaging

Accurate measurement of the two-wavelength emission intensities is critical for accurate measurement of the temperature as shown in Equation (4). The abovementioned method of spatial modulation based TSIT is facile and neat but still might be subjected to pixel-to-pixel sensing variances within a single camera, although it already eliminates the camera-to-camera sensing variances in conventional two-camera imaging thermography. A further improvement can be achieved according to the present disclosure by capturing two-wavelength intensities using the same pixel sensor by a temporally modulated multi-wavelength imaging. The temporal modulation scheme works with the help of the two controllable digital shutters placed in each light path, labelled as digital switches 40 in FIG. 3. These shutters 40 are controlled by the DAQ system 42 connected to the computer. The sampling rate of the DAQ system 42 is in the order of MHz ($10^6$ Hz). By setting the target frequency and phase of two beams 11C, 11D, the DAQ system 42 outputs modulation signals 11E, 11F in 50% duty cycle to digital switches 40. Correspondingly, the shutter of two digital switches 40 opens and closes repeatedly to dynamically modulate the two incoming beams 11C, 11D forming the temporal modulation profile 51 shown in FIG. 4. This explains that the continuous beams 11C, 11D will become two pulsed beams 11E, 11F after modulation, with no time overlapping. Temporal modulation allows for the imaging of two overlapping beams 11E, 11F with the help of high-speed camera 30.

Figure 3:
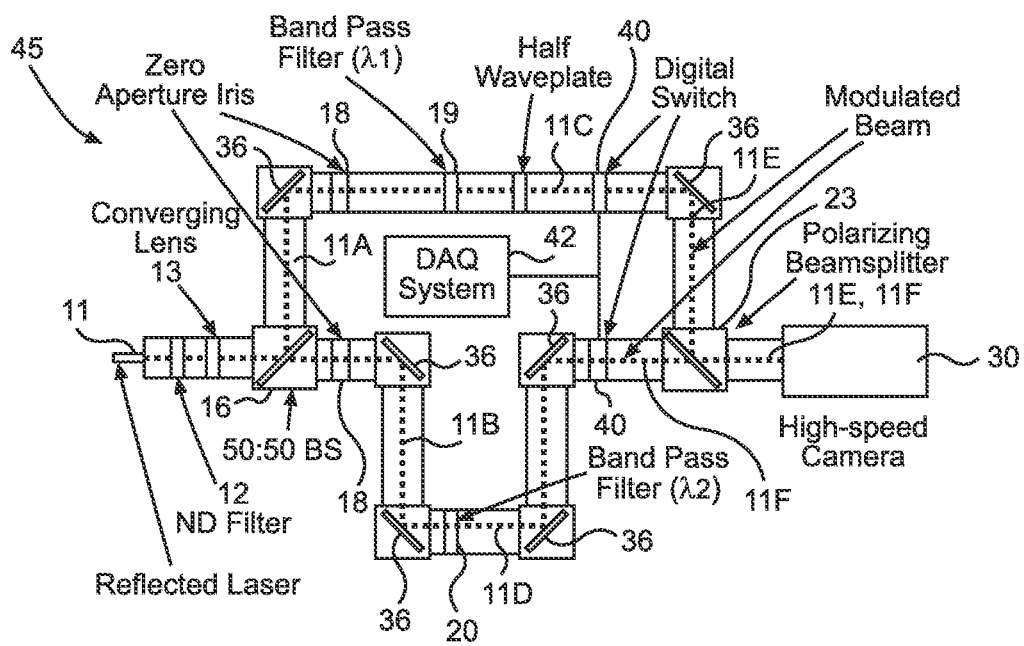
FIG. 3 shows a preferred measurement system of the present disclosure with time domain modulation including the high-frequency digital switches (e.g., diaphragm shutters) for dynamically modulating the measurement beams.
Figure 4:
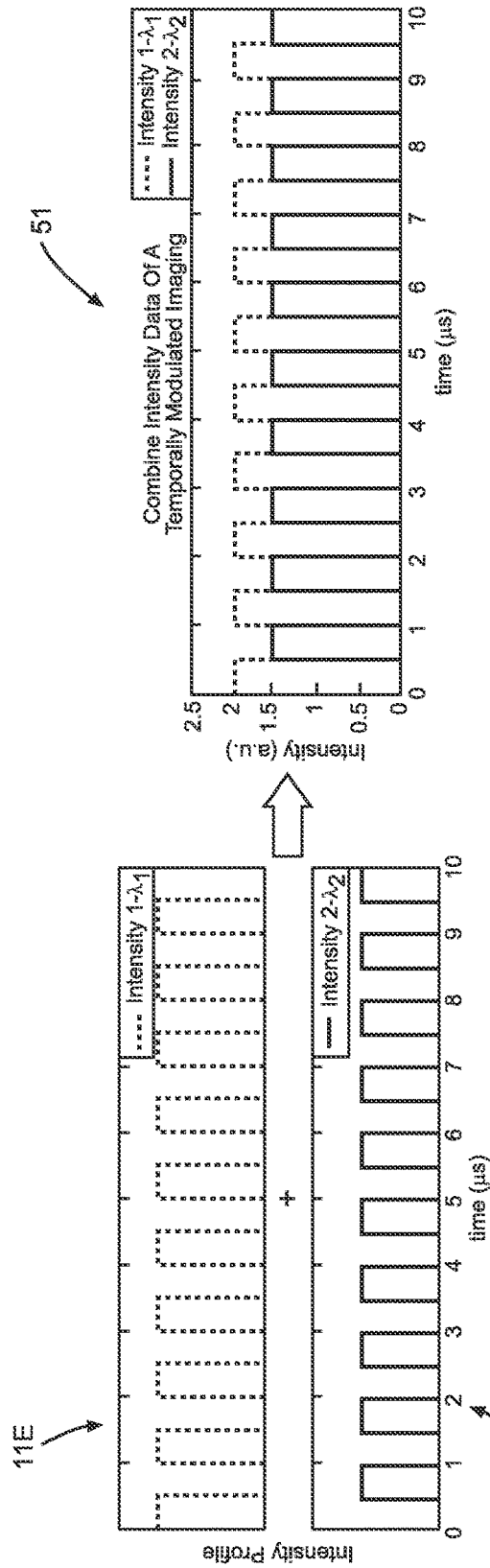
FIG. 4 shows a preferred temporal modulation scheme of the present disclosure for TSIT.

The working of the system 45 of FIG. 3 is first, incoming beam 11C with intensity $I_1$, corresponding to $\lambda_1$ is modulated in time domain to form beam 11E as shown in FIG. 4 (left side). The modulation frequency is adjusted based on the exposure time setting of the camera 30. For instance, in the example shown below the modulation frequency is set at 1 MHz and the exposure time of the camera 30 is 10 μs. Similarly, incoming beam 11D with intensity $I_2$, corresponding to $\lambda_1$ is also modulated at the same frequency to form beam 11F, but with a time lag (FIG. 3). This time lag and time domain modulation of the intensities aid in capturing the light beams 11E, 11F with two wavelengths on a single camera image sensor 30. The image/video data for each time block, say, 0.5 μs block (FIG. 4) are stored in separated data slots as programmed in the camera's software interface (PFV 4.0, Photron Research). A complete intensity profile is obtained when all these data are integrated together, as shown, resulting in a final data output plot 51 (FIG. 4). Based on Eq. 4, this data can be used for estimating the temperature profile of the melt pool. This modulation provides a convenience to the user to set the modulation frequency, time lag based on their application. Also, a single wavelength data can also be easily acquired without changing the hardware setup of the measurement system.

As shown in FIG. 3, system 45 of the present disclosure shares common elements (labeled with the same reference numerals) as system 10 of FIG. 1.

FIG. 4 shows the temporal modulation scheme for a TSIT 45 of the present disclosure. The left side of FIG. 4 shows the time domain modulation of the two incoming beams 11E, 11F with intensities $I_1$ and $I_2$ with a certain modulation frequency and time lag to accommodate equal number of data points for each intensity profile. The final output 51 of the data will be similar to the intensity profile shown in the right-hand side plot of FIG. 4. These respective intensities are used to calculate the temperature based on Equation. 4.

Systems and Methods to Tune Wavelengths for Adaptive and Accurate Temperature Measurement Another unique feature is that the system of present disclosure preferably may include tunable filters 60, 62 to unprecedentedly enable dynamical configuration of the two measurement wavelengths to (1) adaptively measure the temperature profiles for diverse printing materials and (2) incorporate the emissivity variations into the measurement model to enhance the accuracy of temperature measurement. It is known that different materials have different emissivities which further vary by wavelength, temperature and other factors [10].

Provided a precursor metal material, the corresponding spectral emissivity curve will be employed to choose an optimal pair of two wavelengths to measure the temperature accurately. It is noted that in the two-wavelength temperature measuring method, the two wavelengths are chosen based on the assumption that the emissivity in the chosen wavelength range is almost the same ($\varepsilon_1 \approx \varepsilon_2$). Therefore, choosing the correct wavelengths is very critical for accurate temperature measurements [9]. Preferably, the addition of the tunable filters and adaptive optics 60, 62 to the measurement system 45 of FIG. 3 to make system 70 shown in FIG. 6 will help overcome the listed issues and also making system 70 applicable to smartly, robustly and accurately measure and monitor the process dynamics during metal additive manufacturing with multiple materials or different materials for various fabrication scenarios. This novel design can be generalized for all possible combinations of two wavelengths to adaptively measure the process temperature during metal AM and can be modularized to provide design flexibility and to meet various measurement requirements under various scenarios with various or multiple materials. Especially, for multi-material AM, the tunable filters can dynamically change the setting of measurement wavelengths to adapt to material's temperature measurement, resulting in a material-wise temperature profile. This invented approach aims to be more accurate than traditional methods that adopt a single two-wavelength setting throughout the process and cannot account for the materials variations or material-dependent emissivity.

Figure 5:
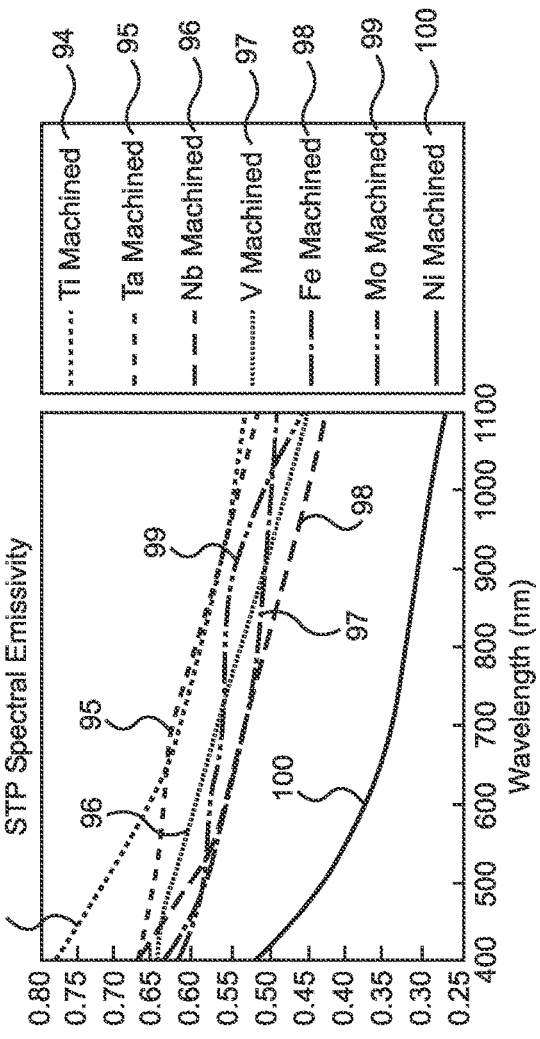
FIG. 5 shows a spectral emissivity profile of various metals from 400 nm to 1100 nm.

FIG. 5 shows spectral emissivity profile of various metals from 400 nm to 1100 nm [11]. The wavelength ranges of "emissivity flat region" differs in the metal materials shown, namely, Ti machined 94, Ta machined 95, Nb machined 96, V machined 97, Fe machined 98, Mo machined 99 and Ni machined 100.

Existing two-wavelength techniques have the limitation that it can be accurate for only a fixed wavelength range, which is dependent on the band-pass filters of the system. For materials where the emissivity values are distinct at the lower and upper wavelengths of two-wavelength system, measurement can lead to errors. FIG. 5 illustrates the spectral emissivity profiles of several metal materials. It can be clearly observed that these materials have different emissivity curves along the wavelength, e.g. Mo 99 has a "flat emissivity" profile from 500 nm to 700 nm but at this range, Ni 100 emissivity significantly decreases. Considering this adversity, we enhance the current design to address this problem, by the incorporating tunable filters 60, 62 and other necessary adaptive optics components. The adaptive optics 60, 62 are designed to automatically correct the aberrations due to the changing of wavelength in the light path to ensure that the overall measurement optics remain accurate for different materials or processes during manufacturing.

Figure 6:
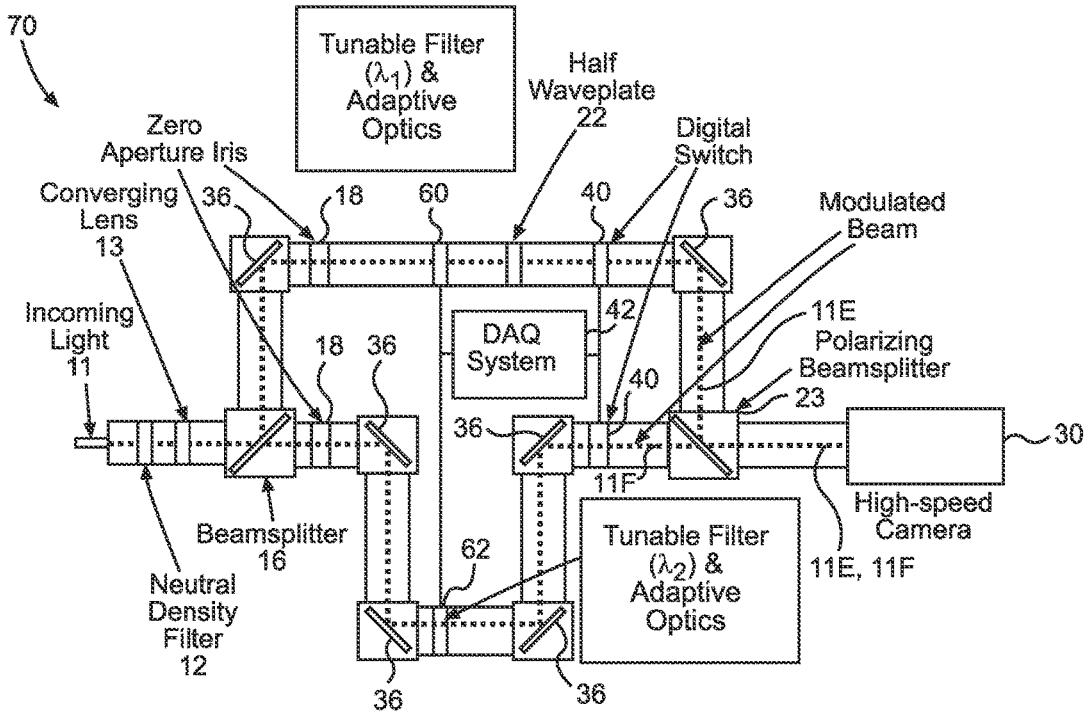
FIG. 6 shows a preferred TSIT system of the present disclosure with a temporal modulation based Adaptive TSIT (ATSIT) incorporated with add-on features as described herein.

FIG. 6 shows a preferred embodiment of an advanced TSIT system—a temporal modulation based Adaptive TSIT (ATSIT) system 70 incorporated with add-on features as described herein. The wavelength-fixed band-pass filters 19, 20 of systems 10 and 45 shown in FIGS. 1-3 are replaced with tunable filters and adaptive optics components 60, 62. As shown in FIG. 6, system 70 of the present disclosure shares common elements (labeled with the same reference numerals) as system 10 of FIG. 1 and system 45 of FIG. 3.

FIG. 6 provides the working principle of the ATSIT system 70 equipped with tunable band-pass filters and temporary beam modulation 60, 62. Controlled by data acquisition (DAQ) system 42, the tunable band-pass filters 60, 62 are adjusted to output effective band-pass wavelength based on metal material emissivity profiles in light beams 11E and 11F captured on single camera image sensor 30. This helps improve the overall accuracy of temperature measurement on multi-material metal AM and allows for the precise temperature measurement of metal materials in a great variety. Further, a combination of tunable filters 60, 62 and online machine learning will allow the system 70 to dynamically measure emissivity profiles and intelligently choose the optimal wavelength settings to secure the accurate measurement of all types of metal materials during metal AM processes.

Image Processing and Data Analytics

Image pixels of the same scene or measured object should be matched among these measurement wavelengths. Image processing such as scaling and rotating may or may not be employed to analyze the images of different wavelengths. Additional sensor data analytics may or may not be developed to derive temperature.

Machine Learning

Machine learning (ML) techniques are used to estimate the evolution of emissivity more accurately and thus the temperature during the metal AM process. Based on the theory and application of ML methods such as Convolution Neural Networks (CNN) and Deep Neural Networks (DNN) algorithms, a rigorous custom algorithm can be developed and applied to the data acquired from these studies and further can be used to predict temperature and emissivity profiles in real-time.

Embodiment Designs

There are various preferred embodiment designs and applications of the method of ATSIT of the present disclosure as shown in FIGS. 1, 2A, 2B, 3, 6 and 7 for use in a variety of metal manufacturing processes including but not limited metal AM processes (e.g., laser powder bed fusion, electron beam powder bed fusion, wire arc welding) and other metal manufacturing processes. Such ATSIT systems and methods of the present disclosure are designed to facilitate various AM techniques. It is capable of measuring temperature profiles virtually all types of metal AM processes where energy-matter interactions occur to form high temperature profiles. Such ATSIT systems and methods of the present disclosure can be applied to other metal manufacturing processes as well. The present disclosure aims to expand the design of the system to maximize its compatibility with various metal AM processes. This includes arranging necessary space for establishing corresponding measurement system, tailoring optical path and properly choosing system components to satisfy the measurement requirements. Therefore, all the optical components within the ATSIT systems of the present disclosure are designed to be modular, the systems and methods can be flexibly embodied and applied to accommodate specific metal AM scenarios.

In general, a variety of embodiment designs of the method and systems of the present disclosure are expected to be applicable to different metal AM processes. The ATSIT technology of the present disclosure can be used for fast, accurate and robust in-situ temperature measurement for a variety of metal AM processes, including but not limited to laser power bed fusion (LPBF), electron beam melting (EBM), laser engineered net shaping (LENS), and wire arc welding based AM.

Figure 7:
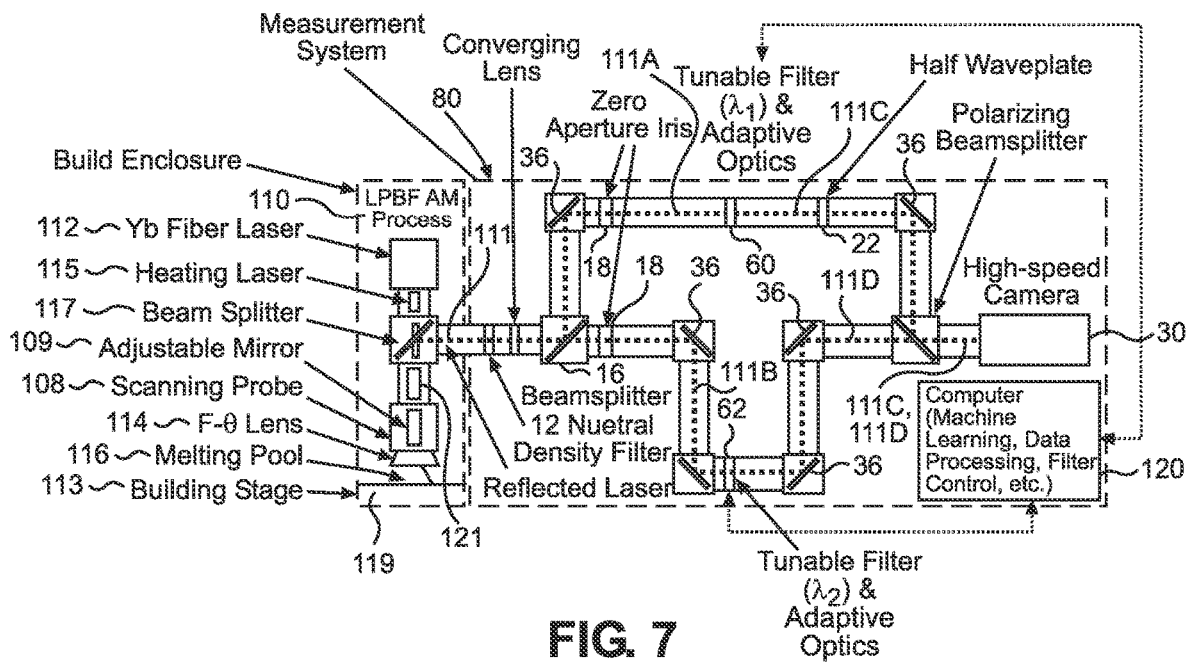
FIG. 7 shows a preferred layout of temporal modulation based adaptive two-wavelength single-camera imaging thermography (ATSIT) design in laser power bed fusion (LPBF) metal AM of the present disclosure having tunable filters and adaptive optics to form a spatial modulation based ATSIT system for a preferred LPBF process.

FIG. 7 shows another preferred embodiment of an ATSIT system 80 for a LPBF process 110. FIG. 7 shows the overall layout of the system 80, where the ATSIT system 80 is connected to the laser power bed fusion (LPBF) building process 110. The printing process 110 is initiated by a laser beam by Yb fiber laser source 112, with a working wavelength at 1064 nm. The laser beam 111 is transmitted to beam splitter 117 and further reflected by an adjustable mirror 109 in the scanning probe 108 for projecting on the building stage 113. An f-θ lens 114 is installed to output the laser 115, focusing it onto the building stage 113. The focused laser 115 spot heats the powders within its region and the high-temperature melt pool 116 is formed, where metal powders are violently liquefied. The heating and cooling rates of the melt pool 116 are in the order of 10's of μs. During the printing process, the melt pool 116 and the surrounding regions emit light in a wide range of wavelengths. The emitted light 111, along with laser reflected by the melt pool 116, propagates the opposite path to the heating laser 115 and is partially reflected by the beam splitter 117 to the measurement system 80 as shown in FIG. 7. Based on the emitted light intensities and by applying the two-wavelength measurement principle the temperature is estimated by system 80 from light beams 111C and 111D captured on single camera imaging sensor 30 as shown in FIG. 7. As shown in FIG. 7, system 80 of the present disclosure shares common elements (labeled with the same reference numerals) as system 10 of FIG. 1, system 45 of FIG. 3 and system 70 of FIG. 6.

FIG. 7 shows a preferred design of a temporal modulation based adaptive two-wavelength single-camera imaging thermography (ATSIT) system 80 for use in laser power bed fusion (LPBF) metal AM process 110. Within the building enclosure, laser 115 creates metal melt pool 116 on metal power layer 119. The light emission 121 of melt pool 116 and reflected laser 115 are collected by the measurement system 80 for processing by computer 120 preferably incorporating machine learning, data processing and system controls for system 80. The inlet of the measurement system receives the reflected light 111 from the built-in beam splitter 117 in the enclosure.

The optics components described above are subject to change or modification in an embodiment design for a certain metal AM process or machine or material. Tunable wavelength filters may be used in place of the band pass filters in each light beam to allow using favorable wavelengths for different materials that are printed in a metal AM process. Image processing and data analytics (e.g., machine learning) methods may be developed to analyze the camera sensor data and derive temperature values for a measured object. Extension to multiple wavelength (i.e., more than two wavelength) single-camera thermography is disclosed as well.

It should be understood that while the present disclosure has been described herein in terms of specific embodiments set forth in detail, such embodiments are presented by way of illustration of the general principles of the present disclosure, and the present disclosure is not necessarily limited thereto. Certain modifications and variations in any given material, process step or chemical formula will be readily apparent to those skilled in the art without departing from the true spirit and scope of the present disclosure, and all such modifications and variations should be considered within the scope of the claims that follow.

REFERENCES

1. Clijsters, S., et al., *In situ quality control of the selective laser melting process using a high-speed, real-time melt pool monitoring system*. The International Journal of Advanced Manufacturing Technology, 2014. 75(5-8): p. 1089-1101.
2. Scime, L. and J. Beuth, *Using machine learning to identify in-situ melt pool signatures indicative of flaw formation in a laser powder bed fusion additive manufacturing process*. Additive Manufacturing, 2019. 25: p. 151-165.
3. Scime, L. and J. Beuth, *A multi-scale convolutional neural network for autonomous anomaly detection and classification in a laser powder bed fusion additive manufacturing process*. Additive Manufacturing, 2018. 24: p. 273-286.
4. Bertoli, U. S., et al., *In-situ characterization of laser-powder interaction and cooling rates through high-speed imaging of powder bed fusion additive manufacturing* Materials & Design, 2017. 135: p. 385-396.
5. Ye, D., et al., *Defect detection in selective laser melting technology by acoustic signals with deep belief networks*. The International Journal of Advanced Manufacturing Technology, 2018. 96(5-8): p. 2791-2801.
6. Chen, Y., et al., *Study of aluminum particle combustion in solid propellant plumes using digital in-line holography and imaging pyrometry*. Combustion and Flame, 2017. 182: p. 225-237.
7. Densmore, J. M., et al., *High-speed two-camera imaging pyrometer for mapping fireball temperatures*. Applied Optics, 2011. 50(33): p. 6267-6271.
8. Hooper, P. A., *Melt pool temperature and cooling rates in laser powder bed fusion. Additive Manufacturing*, 2018. 22: p. 548-559.
9. Dagel, D., et al., *Four-color imaging pyrometer for mapping temperatures of laser based metal processes*. 2016, Sandia National Lab: United States.
10. Müller, B. and U. Renz, *Development of a fast fiber-optic two-color pyrometer for the temperature measurement of surfaces with varying emissivities*. Review of Scientific Instruments, 2001. 72(8): p. 3366-3374.
11. T M Hartsfield, A J Iverson, and J K Baldwin. Reflectance determination of optical spectral emissivity of metal surfaces at ambient conditions. Journal of Applied Physics, 124(10):105107, 2018.

What is claimed is:

1. A two-wavelength, single-camera imaging thermography system for in-situ temperature measurement of a target, comprising:
a target light path inlet conduit for receiving a target light beam reflected from the target;
a beam splitter installed in a splitter housing at a distal end of the target light path conduit, wherein the beam splitter divides the target light beam into a first light beam and a second light beam;
a first light path conduit emanating from the splitter housing comprising a first aperture iris installed within the first light path conduit for aligning the first light beam; a first band pass filter installed within the first light path conduit for regulating the first light beam to a first wavelength $\lambda_1$ and a half waveplate installed within the first light path conduit to modulate a polarization ratio of the first light beam of $\lambda_1$ wavelength;
a second light path conduit emanating from the splitter housing comprising a second aperture iris installed within the second light path conduit for aligning the second light beam; a second band pass filter installed within the second light path conduit for regulating the second light beam to a second wavelength $\lambda_2$;
a junction housing, wherein distal ends of each of the first and second light path conduits are connected to the junction housing;
a polarizing beam splitter installed in the junction housing, wherein the polarizing beam splitter reflects the first light beam of $\lambda_1$ wavelength along the same path or a parallel path of the second light beam of $\lambda_2$ wavelength that passes directly through the polarizing beam splitter unreflected to create a merged light beam comprising light of $\lambda_1$ and $\lambda_2$ wavelengths; and
a light path outlet conduit connected to the junction for directing the merged beam to a high-speed camera for imaging.

2. The two-wavelength, single-camera imaging thermography system of claim 1, wherein the first light path conduit comprises a first plurality of mirrors for directing the first light beam through the first light path conduit and wherein the second light path conduit comprises a second plurality of mirrors for directing the second light beam through the second light path conduit.

3. The two-wavelength, single-camera imaging thermography system of claim 1, wherein the first and second light path conduits are configured so that light travel time through the first light path conduit is equal to light travel time through the second light path conduit.

4. The two-wavelength, single-camera imaging thermography system of claim 2, wherein the first plurality of mirrors is equal to or not equal to the second plurality of mirrors.

5. The two-wavelength, single-camera imaging thermography system of claim 1, wherein the converging lens is an infinite-corrected converging lens.

6. The two-wavelength, single-camera imaging thermography system of claim 1, wherein the beam splitter divides the target light beam into the first light beam and the second light beam which are equal or unequal.

7. The two-wavelength, single-camera imaging thermography system of claim 1, wherein none of the first and second light path conduits define only a single straight line from the splitter housing to the junction housing.

8. The two-wavelength, single-camera imaging thermography system of claim 1, further comprising a computer controller which may or may not use machine learning or artificial intelligence.

9. The two-wavelength, single-camera imaging thermography system of claim 1, further comprising a computer controllable digital shutter installed in each of the first and second light path conduits, wherein each of the computer controllable digital shutters is controlled by a DAQ system connected to a computer associated with the system.

10. The two-wavelength, single-camera imaging thermography system of claim 9 wherein sampling rates of the DAQ system are in the order of MHz ($10^6$ Hz).

11. The two-wavelength, single-camera imaging thermography system of claim 9, wherein frequency and phase of the first and second light beams are set so that the DAQ system outputs modulation signals in partial duty cycle to each of the computer controllable digital shutters to allow each of the shutters to open and close repeatedly to dynamically modulate the first and second light beams, respectively, to form a temporal modulation profile, wherein the first and second light beams have been transformed from continuous beams to two pulsed beams after this dynamic modulation, with no time overlapping.

12. The two-wavelength, single-camera imaging thermography system of claim 1, wherein each of the first and second band pass filters may or may not comprise a tunable band pass filter.

13. A method for two-wavelength, single-camera imaging thermography for in-situ temperature measurement of a target, comprising:
receiving in a target light path inlet conduit a target light beam reflected from the target;
attenuating the target light beam;
converging the target light beam;
removing aberrations from the target light beam;
dividing the target light beam into a first light beam and a second light beam;
directing the first light beam through a first aperture iris to align the first light beam;
directing the first light beam through a first tunable or non-tunable band pass filter to regulate the first light beam to a first wavelength Xi;
directing the second light beam through a second aperture iris to align the second light beam;
directing the second light beam through a second tunable or non-tunable band pass filter to regulate the second light beam to a first wavelength $\lambda_2$;
merging the first light beam of $\lambda_1$ wavelength along the same path or a parallel path of the second light beam of $\lambda_2$ wavelength to create a merged light beam comprising light of $\lambda_1$ and $\lambda_2$ wavelengths; and
directing the merged beam to a high-speed camera for imaging.

14. The method of claim 13 further comprising:
directing the first light beam through a half waveplate to modulate a polarization ratio of the first light beam of $\lambda_1$ wavelength;
reflecting the first light beam of $\lambda_1$ wavelength off of a polarizing beam splitter;
passing the second light beam of $\lambda_2$ wavelength directly through the polarizing beam splitter unreflected along the same path or a parallel path as the reflected first light beam of $\lambda_1$ wavelength to create the merged light beam comprising light of $\lambda_1$ and $\lambda_2$ wavelengths.

15. The method of claim 13 or claim 14 further comprising:
directing each of the first and second light beams through a respective computer controllable digital shutter.

16. The method of claim 15 comprising:
setting the frequency and phase of the first and second light beams so that a DAQ system of a computer controlling each of the computer controllable digital shutters outputs modulation signals in a partial duty cycle to each of the computer controllable digital shutters to allow each of the shutters to open and close repeatedly to dynamically modulate the first and second light beams, respectively, to form a temporal modulation profile, wherein the first and second light beams have been transformed from continuous beams to two pulsed beams after this dynamic modulation, with no time overlapping.

17. The two-wavelength, single-camera imaging thermography system of claim 1, further comprising a power attenuating neutral density filter installed within the light path inlet tube.

18. The two-wavelength, single-camera imaging thermography system of claim 1, further comprising a converging lens installed within the light path inlet tube for converging the target light beam and removing aberrations from the target light beam.

19. The two-wavelength, single-camera imaging thermography system of claim 9 wherein sampling rates of the DAQ system are in the order of MHz ($10^4$ Hz).

20. The method of claim 14 further comprising: directing each of the first and second light beams through a respective computer controllable digital shutter.

* * * * *